July 30, 1963
J. BERGER
3,099,702
FIVE LENS OBJECTIVE
Filed Feb. 12, 1962
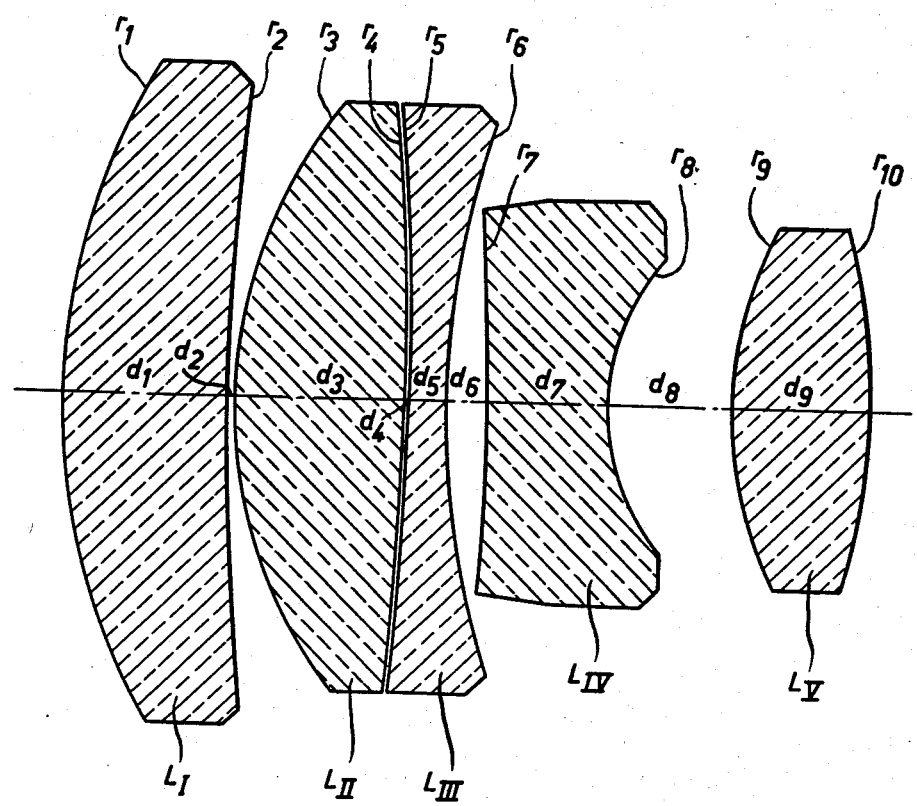

United States Patent Office 3,099,702
Patented July 30, 1963

3,099,702
FIVE LENS OBJECTIVE
Johannes Berger, Heidenheim (Brenz), Wurttemberg, Germany, assignor to Carl Zeiss, Heidenheim (Brenz), Wurttemberg, Germany
Filed Feb. 12, 1962, Ser. No. 172,829
Claims priority, application Germany Oct. 30, 1958
1 Claim. (Cl. 88—57)

This application is a continuation-in-part application of my copending application Ser. No. 848,867, filed October 26, 1959, now abandoned.

The invention concerns objectives for taking photographs as well as for projection, particularly for small-film projectors. It is the aim of the invention to produce objectives for the said purpose which with a relatively large aperture ratio of 1:1.2 cover an angular field of ±8° with good definition. Object of the invention is an objective which consists of five lenses the first being a meniscus-shaped collective lens with its concave surface turned towards the second lens, the said second lens being an asymmetrical collective lens turning its surface of smaller curvature towards the third lens, the said third lens being an asymmetrical dispersive lens turning its surface of stronger curvature towards the fourth lens which is also an asymmetrical dispersive lens turning its surface of stronger curvature towards the fifth lens while the fifth lens is a biconvex collective lens and in which objective additionally the following conditions are simultaneously satisfied:

(a) The sum of the air spaces between the individual lenses is smaller than 30% but greater than 10% of the overall length wherein the overall length itself is greater than 80% of the focal length;

(b) $\quad r_3 < r_1 < 2 \cdot r_3$
(c) $\quad r_3 < r_6 < 3 \cdot r_3$
(d) $\quad 0.35 \cdot r_9 < r_8 < 0.70 \cdot r_9$
(e) $\quad r_9 < -r_{10} < 2 \cdot r_9$ (f) $\quad 1.6 < n_{III} < \dfrac{n_I + n_{II} + n_{IV} + n_V}{4} < 1.8$ wherein are designated by $r$ the radii of the lens surfaces and by $n$ the refractive indices of the lens elements.

In the appended illustration the schematic design of an objective according to the invention is represented in section.

The appended table contains the design data for one embodiment of an objective according to the invention. The table values are normalized for a focal length of $f = 1.0$.

In the FIGURE and in the table there are designated:

By L, the lenses,
By r, the radii,
By d, the axial separations,
By $n_d$, the refractive indices for the d-line of the spectrum,
By $\nu_d$, the corresponding Abbé numbers, and
By s', the focal intercept.

Table

| Lenses | Radii | Axial separations | $n_d$ | $\nu_d$ |
|---|---|---|---|---|
| $L_I$ | $r_1 = +0.84527$ | $d_1 = 0.21437$ | 1.71300 | 53.89 |
| | $r_2 = +4.9281$ | $d_2 = 0.00394$ | | |
| $L_{II}$ | $r_3 = +0.62932$ | $d_3 = 0.22669$ | 1.71300 | 53.89 |
| | $r_4 = -19.3384$ | $d_4 = 0,00000$ | | |
| $L_{III}$ | $r_5 = -19.3384$ | $d_5 = 0.04928$ | 1.69895 | 30.05 |
| | $r_6 = +1.1519$ | $d_6 = 0.05322$ | | |
| $L_{IV}$ | $r_7 = -14.2948$ | $d_7 = 0.16115$ | 1.80518 | 25.46 |
| | $r_8 = +0.29781$ | $d_8 = 0.16263$ | | |
| $L_V$ | $r_9 = +0.53342$ | $d_9 = 0.18234$ | 1.74400 | 44.90 |
| | $r_{10} = -0.87006$ | | | |

Note.—s' = 0.3159.

I claim:

A photographic objective consisting of five lenses of which the first is a meniscus-shaped collective lens with its concave surface turned towards the second lens, the said second lens being an asymmetrical collective lens turning its surface of smaller curvature towards the third lens, the said third lens being an asymmetrical dispersive lens turning its surface of stronger curvature towards the fourth lens, the said fourth lens being also an asymmetrical dispersive lens turning its surface of stronger curvature towards the fifth lens, and the said fifth lens being a biconvex collective lens, characterized by the combination of the following features:

(a) the sum of the air spaces between the individual lenses is smaller than 30% but greater than 10% of the overall length wherein the overall length itself is greater than 80% of the focal length;

(b) $\quad r_3 < r_1 < 2 \cdot r_3$
(c) $\quad r_3 < r_6 < 3 \cdot r_3$
(d) $\quad 0.35 \cdot r_9 < r_8 < 0.70 \cdot r_9$
(e) $\quad r_9 < -r_{10} < 2 \cdot r_9$ (f) $\quad 1.6 < n_{III} < \dfrac{n_I + n_{II} + n_{IV} + n_V}{4} < 1.8$ and furthermore characterized in that its design data lie so close to the values to be taken from the appended table that none of the axial separations (d) differs by more than the values given in parantheses below the respective separation value given in the following table:

| Lenses | Radii | Axial separations | $n_d$ | $\nu_d$ | $\Delta n/r$ |
|---|---|---|---|---|---|
| $L_I$ | $r_1 = +0.84527 \cdot f$ | | | | $+0.843517/f$ |
| | | $d_1 = 0.21437 \cdot f$<br>$(+0.03)$<br>$(-0.03)$ | 1.71300 | 53.89 | |
| | $r_2 = +4.9281 \cdot f$ | | | | $-0.144680/f$ |
| | | $d_2 = 0.00394 \cdot f$<br>$(+0.03)$<br>$(-0.000)$ | | | |
| $L_{II}$ | $r_3 = +0.62932 \cdot f$ | | | | $+1.132969/f$ |
| | | $d_3 = 0.22669 \cdot f$<br>$(+0.03)$<br>$(-0.03)$ | 1.71300 | 53.89 | |
| | $r_4 = -19.3384 \cdot f$ | | | | $+0.036870/f$ |
| | | $d_4 = 0.00000$<br>$(+0.03)$<br>$(-0.00)$ | | | |
| $L_{III}$ | $r_5 = -19.3384 \cdot f$ | | | | $-0.036143/f$ |
| | | $d_5 = 0.04928 \cdot f$<br>$(+0.03)$<br>$(-0.02)$ | 1.69895 | 30.05 | |
| | $r_6 = +1.1519 \cdot f$ | | | | $-0.606780/f$ |
| | | $d_6 = 0.05322 \cdot f$<br>$(+0.03)$<br>$(-0.01)$ | | | |
| $L_{IV}$ | $r_7 = -14.2948 \cdot f$ | | | | $-0.056327/f$ |
| | | $d_7 = 0.16115 \cdot f$<br>$(+0.03)$<br>$(-0.03)$ | 1.80518 | 25.46 | |
| | $r_8 = +0.29781 \cdot f$ | | | | $-2.703670/f$ |
| | | $d_8 = 0.16263 \cdot f$<br>$(+0.03)$<br>$(-0.03)$ | | | |
| $L_V$ | $r_9 = +0.53342 \cdot f$ | | | | $+1.394773/f$ |
| | | $d_9 = 0.18234 \cdot f$<br>$(+0.03)$<br>$(-0.03)$ | 1.74400 | 44.90 | |
| | $r_{10} = -0.87006 \cdot f$ | | | | $+0.855113/f$ |

NOTE.—$s' = 0.3159 \cdot f$.

wherein are designated
 by L, the lenses,
 by $r$, the radii,
 by $d$, the axial separations,
 by $n_d$, the refractive indices for the $d$-line of the spectrum,
 by $\nu_d$, the corresponding Abbé numbers, and
 by $s'$, the focal intercept.

No references cited.